US012649352B1

(12) United States Patent
Schubart et al.

(10) Patent No.: US 12,649,352 B1
(45) Date of Patent: Jun. 9, 2026

(54) ELECTRIC VEHICLE WITH MODULE MOUNTING STRUCTURE

(71) Applicant: Oshkosh Defense, LLC, Oshkosh, WI (US)

(72) Inventors: Kai P. Schubart, Oshkosh, WI (US); Mitchell Wolfrath, Oshkosh, WI (US); Greg Steffens, Oshkosh, WI (US)

(73) Assignee: OSHKOSH DEFENSE, LLC, Oshkosh, WI (US)

( * ) Notice: Subject to any disclaimer, the term of this patent is extended or adjusted under 35 U.S.C. 154(b) by 219 days.

(21) Appl. No.: 18/663,859

(22) Filed: May 14, 2024

Related U.S. Application Data

(60) Provisional application No. 63/502,377, filed on May 15, 2023.

(51) Int. Cl.
B60H 1/00 (2006.01)
B60H 1/32 (2006.01)

(52) U.S. Cl.
CPC ..... B60H 1/00535 (2013.01); B60H 1/00564 (2013.01); B60H 1/3233 (2013.01)

(58) Field of Classification Search
CPC ............ B60H 1/00535; B60H 1/00564; B60H 1/3233; B60H 1/00392; B60H 1/00521; B60H 1/00028; B60H 1/3227; F24F 13/222
USPC .......................................................... 165/42
See application file for complete search history.

(56) References Cited

U.S. PATENT DOCUMENTS

| | | | | |
|---|---|---|---|---|
| 7,856,841 | B2 * | 12/2010 | Kim ..................... | B60H 1/3233 62/244 |
| 7,950,419 | B2 * | 5/2011 | Kaden .................. | B60H 1/3233 138/155 |
| 10,543,733 | B2 * | 1/2020 | Eckelberg ............ | B60H 1/3233 |
| 11,135,896 | B2 * | 10/2021 | Eckelberg .......... | B60H 1/00521 |
| 11,359,824 | B2 * | 6/2022 | Kadu ........................ | F24F 1/22 |
| 12,196,355 | B2 * | 1/2025 | Hövekamp ............ | B62D 25/24 |
| 12,246,623 | B2 * | 3/2025 | Schmidt .................... | B60J 5/06 |
| 2014/0166233 | A1 * | 6/2014 | Wehrenberg ....... | B60H 1/00535 165/42 |
| 2016/0272051 | A1 * | 9/2016 | Hyakuda ............ | B60H 1/00535 |
| 2016/0311288 | A1 * | 10/2016 | Mayo Mayo ........ | B60H 1/3208 |
| 2019/0111757 | A1 * | 4/2019 | Amura ............... | B60H 1/00378 |
| 2024/0174043 | A1 * | 5/2024 | Moon .................. | B60H 1/3233 |

FOREIGN PATENT DOCUMENTS

| | | | | | |
|---|---|---|---|---|---|
| CN | 218536267 | U | * | 2/2023 | |
| EP | 3332996 | A2 | * | 6/2018 | ......... B60H 1/00521 |
| JP | 2007253796 | A | * | 10/2007 | |
| JP | 7657844 | B2 | * | 4/2025 | ........... H10D 86/423 |
| KR | 101240861 | B1 | * | 3/2013 | ............. B62D 25/14 |
| KR | 20230034557 | A | * | 3/2023 | ......... B60H 1/00535 |

* cited by examiner

*Primary Examiner* — Jon T. Schermerhorn, Jr.
(74) *Attorney, Agent, or Firm* — Foley & Lardner LLP

(57) ABSTRACT
An electric delivery vehicle including a cab and a module mounting structure for control module defining at least a portion of a heating, ventilation, and air-conditioning (HVAC) system. The module mounting structure includes a module mount, a drain, and a recess. The module mount is configured to couple the control module with the module mounting structure. The drain is configured to drain fluid from the HVAC system. The recess is configured to receive at least a portion of an air duct of the HVAC system to facilitate air movement through the cab of the electric delivery vehicle.

17 Claims, 19 Drawing Sheets

ELECTRIC VEHICLE WITH MODULE MOUNTING STRUCTURE

CROSS-REFERENCE TO RELATED PATENT APPLICATION

This application claims the benefit of and priority to U.S. Provisional Patent Application No. 63/502,377, filed May 15, 2023, which is incorporated herein by reference in its entirety.

BACKGROUND

Delivery vehicles may have a number of doors, a cab, and a cargo portion. An operator may operate the vehicle from the cab. The cargo portion may serve as a storage area for parcels. The doors may provide entry and exit points for the operator to and from the cab and/or the cargo portion.

SUMMARY

One implementation of the present disclosure relates to an electric delivery vehicle, according to some embodiments. The electric delivery vehicle includes a cab and a module mounting structure for a control module defining at least a portion of a heating, ventilation, and air-conditioning (HVAC) system. The module mounting structure includes a module mount, a drain, and a recess. The module mount is configured to couple the control module with the module mounting structure. The drain is configured to drain fluid from the HVAC system. The recess is configured to receive at least a portion of an air duct of the HVAC system to facilitate air movement through the cab of the electric delivery vehicle.

In some embodiments, the module mounting structure includes a top portion, a first sidewall extending from the top portion at a first end thereof, and a second sidewall extending from the top portion at a second end thereof, the second end opposite the first end. In some embodiments, the module mounting structure defines an internal cavity defined by at least the top portion, the first sidewall, and the second sidewall. In some embodiments, the drain is configured to extend within an internal cavity of the module mounting structure. In some embodiments, the fluid includes condensation from the HVAC system. In some embodiments, the module mounting structure further includes a receptacle along a top portion of the module mounting structure configured collect condensation from the HVAC system and funnel the condensation to the drain. In some embodiments, the electric delivery vehicle further includes a firewall including an outlet. The drain is fluidly coupled with the outlet of the firewall such that condensation from the HVAC system flows through the module mounting structure and out through the firewall. In some embodiments, the recess is positioned along a sidewall of the module mounting structure outside of an inner volume of the module mounting structure. In some embodiments, the module mount is configured to couple the control module with at least one of a top portion, a first sidewall, or a second sidewall of the module mounting structure. In some embodiments, the module mount is configured to couple the control module with the module mounting structure within an inner volume of the module mounting structure.

In some embodiments, the module mounting structure further includes a connector configured to electrically couple the control module with other components of the electric delivery vehicle.

In some embodiments, the control module includes a module connector, and the control module is configured to be coupled to the module mounting structure such that the control module is oriented such that the module connector opens downward to prevent fluid accumulation in the module connector.

In some embodiments, the module mounting structure is a unitary injection-molded structure that is selectively removable from the electric delivery vehicle.

Another implementation of the present disclosure relates to module mounting structure for an electric delivery vehicle, according to some embodiments. In some embodiments, the module mounting structure includes a module mount configured to couple a control module with the module mounting structure, the control module defining at least a portion of a heating, ventilation, and air-conditioning (HVAC) system, a drain configured to drain fluid from the HVAC system, and a recess configured to receive at least a portion of an air duct of the HVAC system to facilitate air movement through a cab of the electric delivery vehicle. The module mounting structure is selectively removable from the electric delivery vehicle.

In some embodiments, the module mounting structure further includes a top portion, a first sidewall extending from the top portion at a first end thereof, and a second sidewall extending from the top portion at a second end thereof, the second end opposite the first end. The module mounting structure defines an internal cavity defined by at least the top portion, the first sidewall, and the second sidewall. In some embodiments, the fluid includes condensation from the HVAC system, and the module mounting structure further includes a receptacle along the top portion of the module mounting structure and configured collect the condensation and funnel the condensation to the drain. In some embodiments, the drain is fluidly coupled with an outlet of a firewall of the electric delivery vehicle such that condensation from the HVAC system flows through the module mounting structure and out through the firewall. In some embodiments, the module mounting structure further includes a connector configured to electrically couple the control module with other components of the electric delivery vehicle. In some embodiments, the control module includes a module connector, and the control module is configured to be coupled to the module mounting structure such that the control module is oriented such that the module connector opens downward to prevent fluid accumulation in the module connector.

Another implementation of the present disclosure relates to an electric delivery vehicle, according to some embodiments. The electric delivery vehicle includes a cab and a module mounting structure for a control module defining at least a portion of a heating, ventilation, and air-conditioning (HVAC) system. The module mounting structure includes a module mount configured to couple the control module with the module mounting structure, a drain extending within in internal cavity defined by the module mounting structure and configured to direct fluid from the HVAC system, a recess configured to receive at least a portion of the HVAC system, and a connector configured to electrically couple the control module with other components of the electric delivery vehicle. The module mounting structure is selectively removable from the electric delivery vehicle. The module mount is configured to couple the control module with the module mounting structure within the internal cavity thereof. The recess is positioned along a sidewall of the module mounting structure outside of the internal cavity.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

According to the exemplary embodiment shown in FIGS. 1-7, a vehicle (e.g., a parcel vehicle, a cargo transport vehicle, a mail vehicle, a postal vehicle, a postal van, a truck, a van, etc.), shown as delivery vehicle 10, is configured to facilitate improved parcel delivery. Generally, the delivery vehicle 10 may be a specialized vehicle that transports parcels (e.g., mail, packages, etc.) from a distribution center (e.g., a post office, a warehouse, etc.) to various delivery locations (e.g., recipients' homes, offices, etc.).

Figure 1:
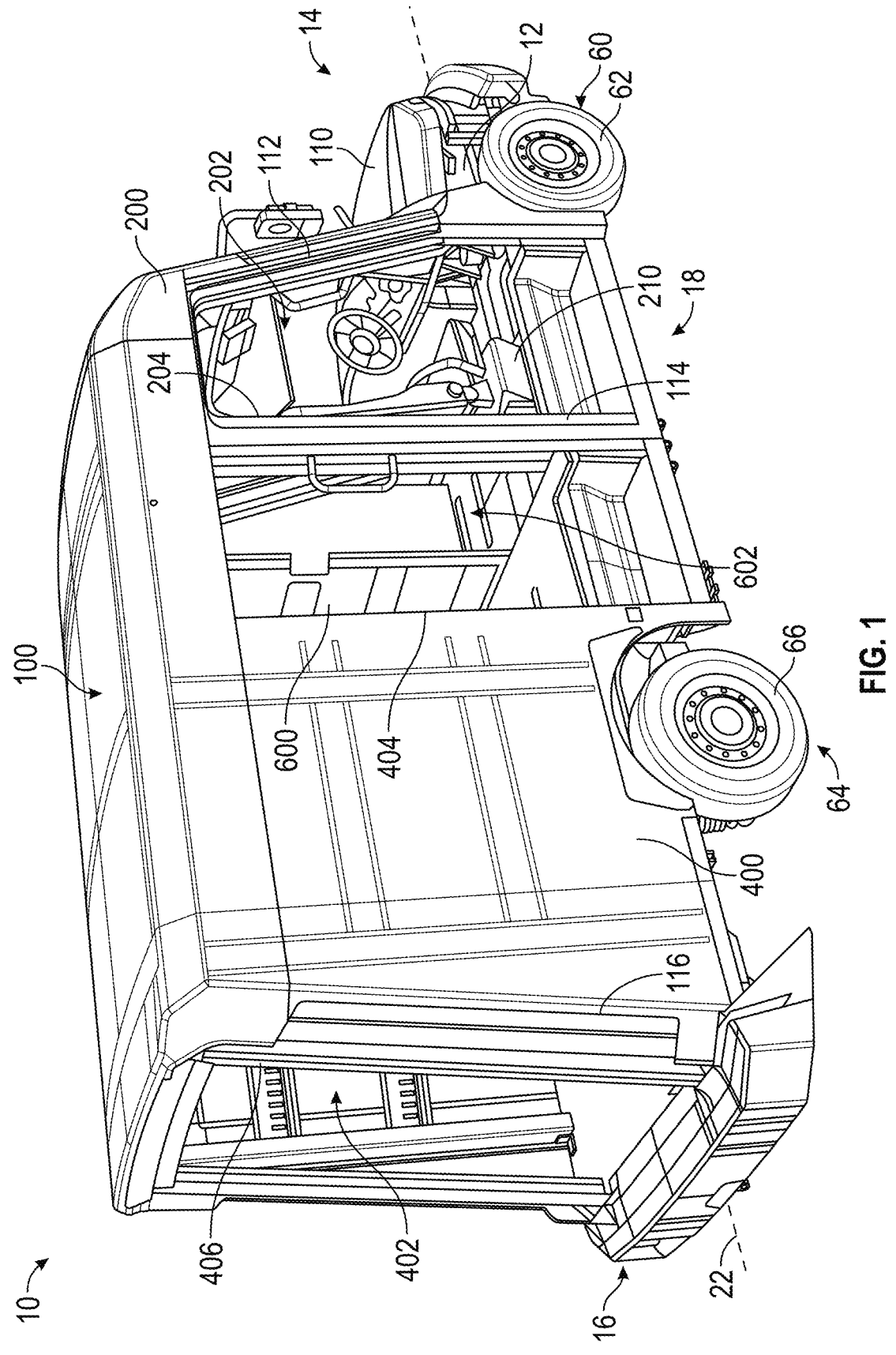
FIG. 1 is a rear perspective view of a delivery vehicle, according to an exemplary embodiment.
Figure 2:
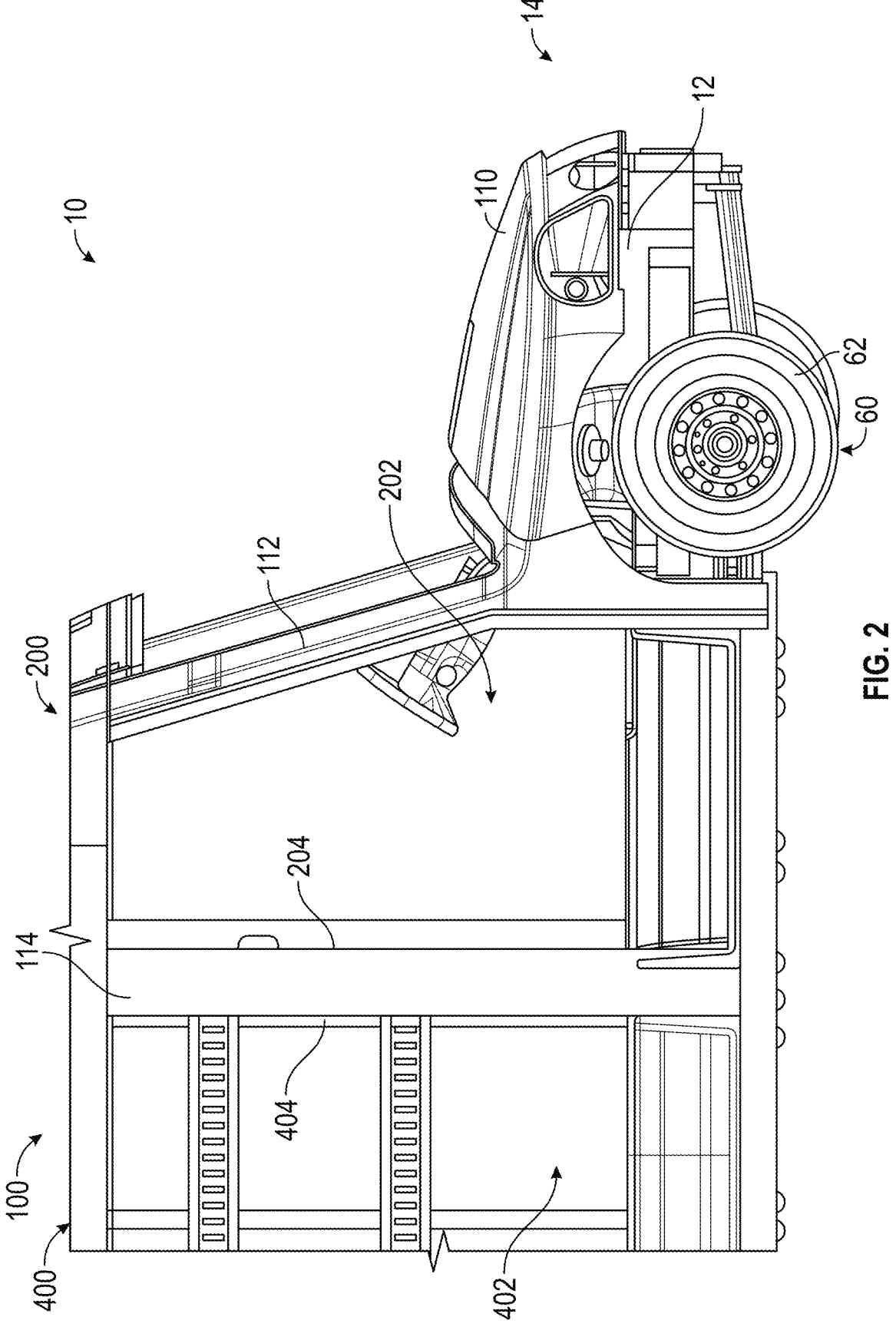
FIG. 2 is a partial side view of the delivery vehicle of FIG. 1, according to an exemplary embodiment.

As shown in FIGS. 1-7, the delivery vehicle 10 includes a chassis, shown as a frame 12. The frame 12 defines a first end, shown as front end 14, an opposing second end, shown as rear end 16, a first lateral side (e.g., a driver side, etc.), shown as right side 18, and an opposing second lateral side (e.g., a passenger side, etc.), shown as left side 20, of the delivery vehicle 10. While components of the delivery vehicle 10 may be described as being positioned along, proximate, adjacent, etc. the right side 18 or the left side 20 herein, it should be understood that such components could be positioned on the opposite side. As shown in FIG. 1, the frame 12 also defines a longitudinal axis, shown as central axis 22, extending longitudinally through the delivery vehicle 10 from the front end 14 to the rear end 16. As shown in FIG. 1-7, the frame 12 supports a first axle, shown as front axle 60, having a first plurality of tractive elements, shown as front wheels 62, coupled thereto; a second axle, shown as rear axle 64, having a second plurality of tractive elements, shown as rear wheels 66, coupled thereto; a power unit, shown as powertrain 70, that drives the front axle 60 and/or the rear axle 64 to move the delivery vehicle 10; and a body assembly, shown as body 100.

Figure 5:
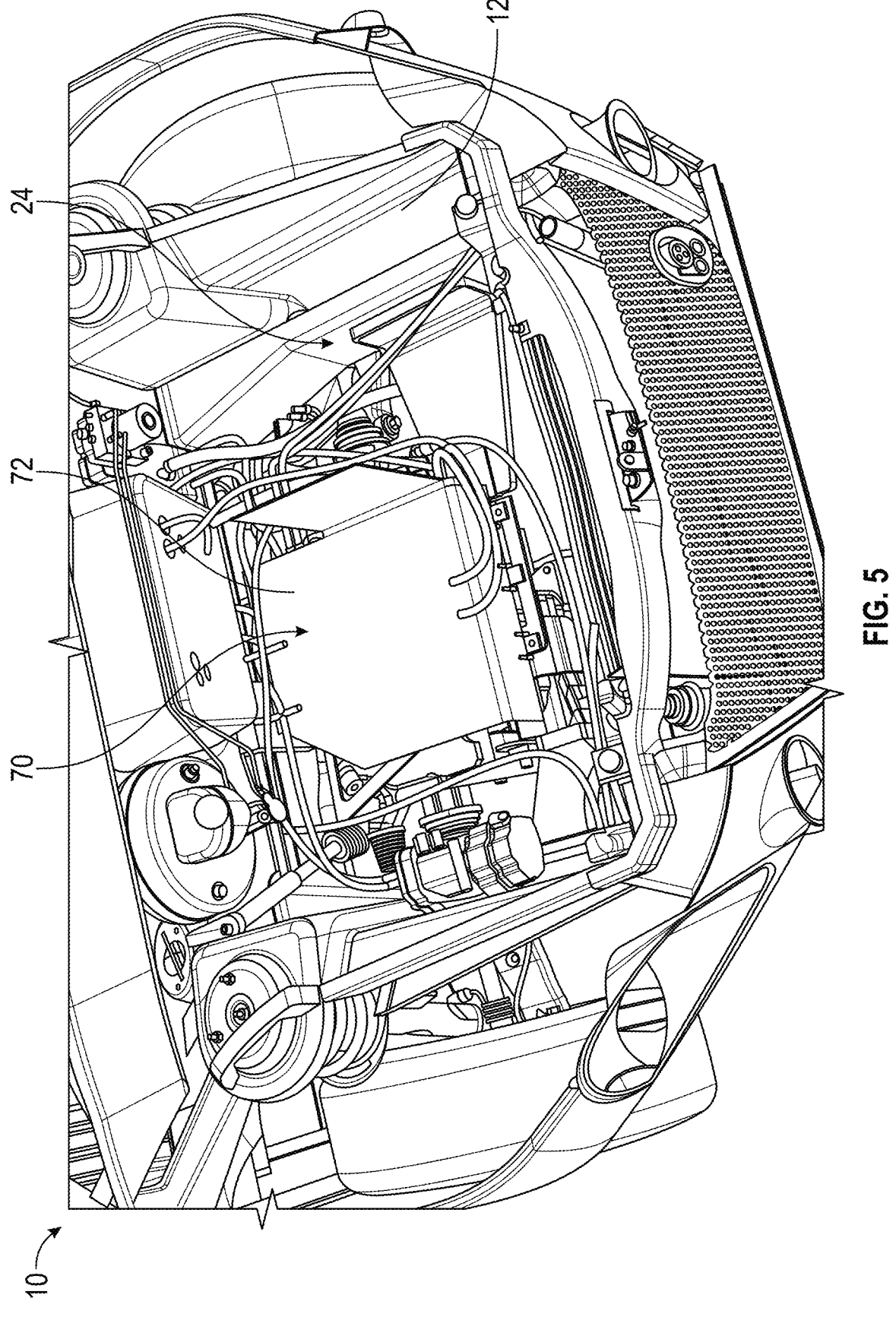
FIG. 5 is a detailed view of a primary driver compartment of the delivery vehicle of FIG. 1, according to an exemplary embodiment.
Figure 6:
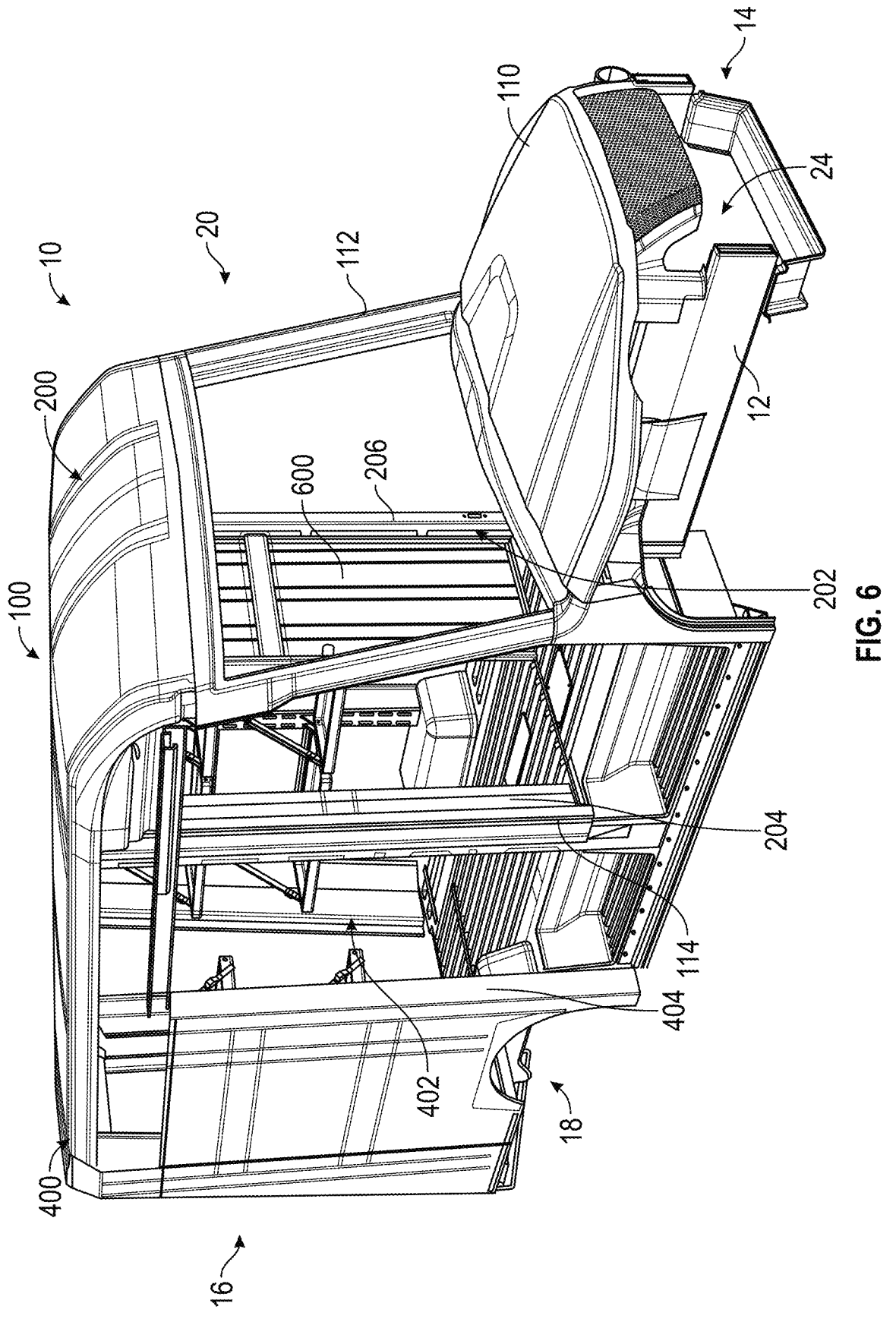
FIG. 6 is a right side perspective view of the delivery vehicle of FIG. 1 without a side door assembly, according to an exemplary embodiment.

As shown in FIG. 5, the powertrain 70 includes a primary driver or prime mover, shown as engine 72, coupled to and disposed within a primary driver compartment, shown as hood compartment 24, at the front end 14 of the frame 12. In some embodiments, the powertrain 70 is a traditional, internal combustion engine driven powertrain. In some embodiments, the powertrain 70 additionally includes on-board energy storage (e.g., a battery pack, etc.), a generator, and/or an electric motor to supplement the engine 72 such that the powertrain 70 is a hybrid powertrain. In some embodiments, the powertrain 70 does not include the engine 72. Rather, the primary driver may be an electric motor and the powertrain 70 may include on-board energy storage such that the powertrain 70 is an electric powertrain. In another embodiment, the primary diver includes a fuel cell and an electric motor such that the powertrain 70 is a fuel cell electric powertrain.

As shown in FIGS. 1-4, 6, and 7, the body 100 includes a hood, shown as hood 110, coupled to the front end 14 of the frame 12 and extending over the hood compartment 24 within which the engine 72 is positioned; a first pair of pillars, shown as A-pillars 112; a second pair of pillars, shown as B-pillars 114; a third pair of pillars, shown as C-pillars 116; a front cabin, shown as cab 200, positioned between the A-pillars 112 and the B-pillars 114; a rear storage section, shown as cargo body 400, positioned behind the cab 200 and between the B-pillars 114 and the C-pillars 116; a divider, shown as partition 600, extending between the B-pillars 114 and at least partially separating the cab 200 from the cargo body 400; and a door assembly, shown as side door assembly 700.

Figure 3:
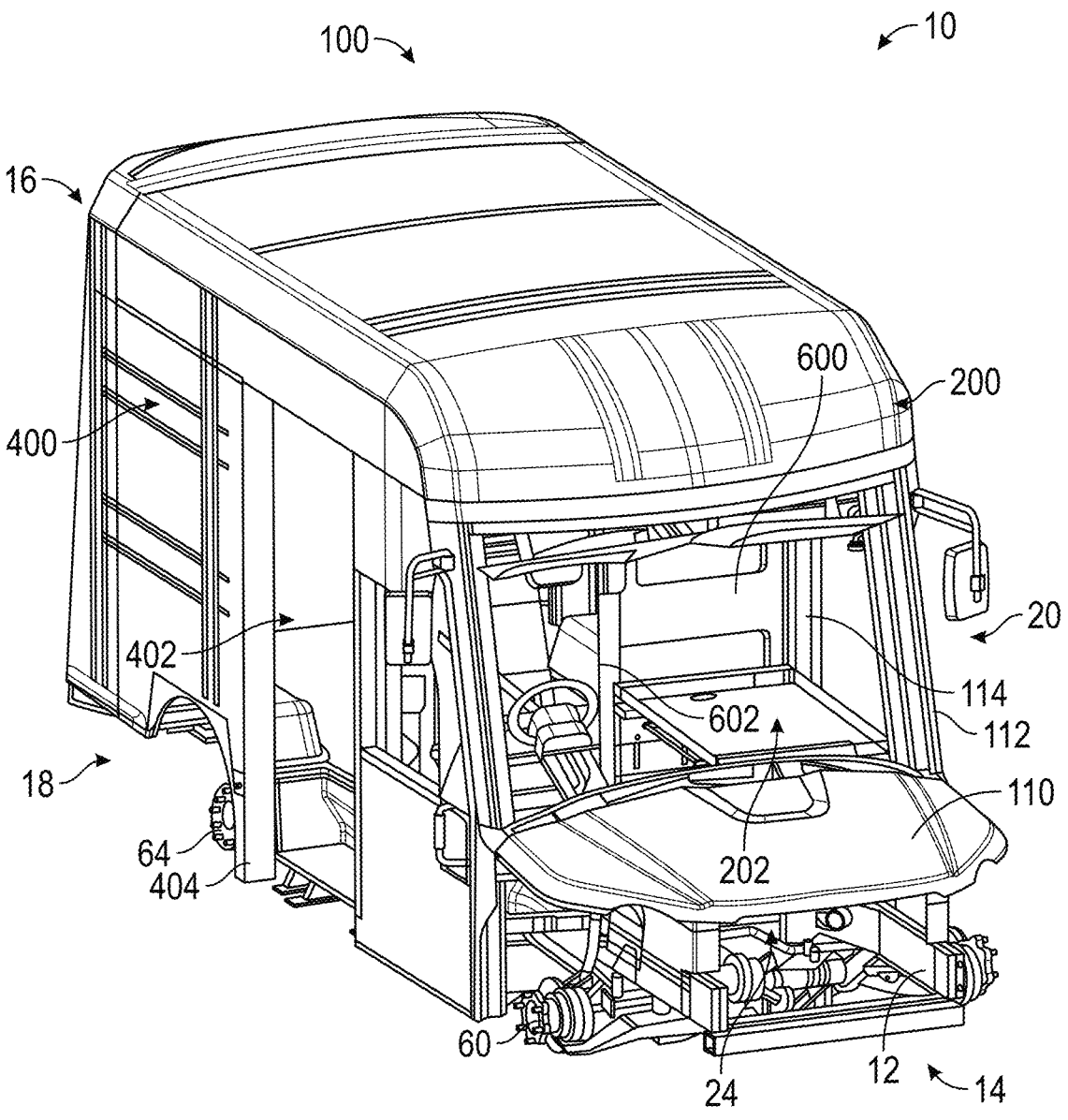
FIG. 3 is a front perspective view of the delivery vehicle of FIG. 1, according to an exemplary embodiment.
Figure 4:
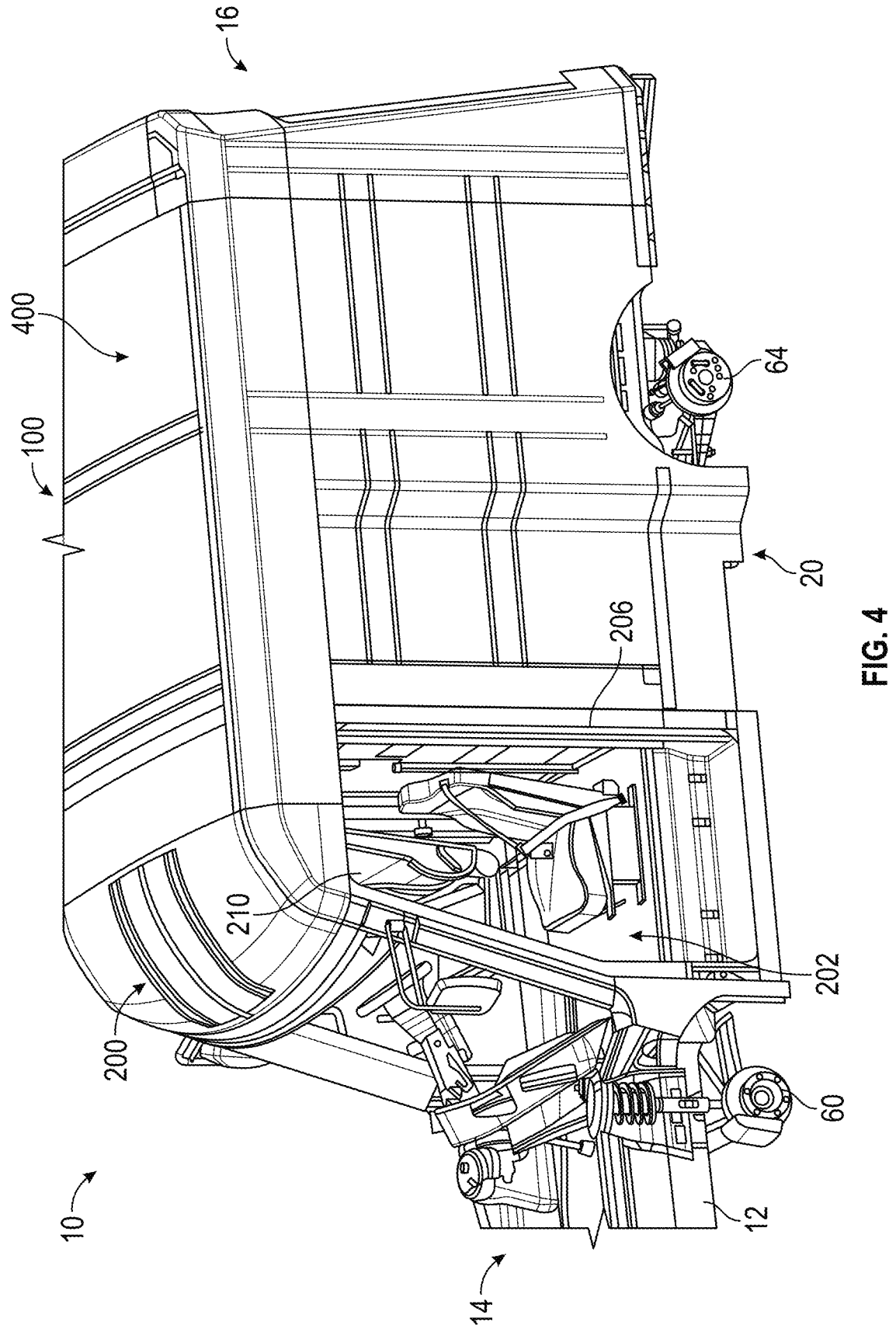
FIG. 4 is a left side perspective view of the delivery vehicle of FIG. 1, according to an exemplary embodiment.

As shown in FIGS. 1-4, 6, and 7, the cab 200 defines a first interior section or zone, shown as driver compartment 202, a first opening, shown as right cab opening 204, and a second opening, shown as left cab opening 206. The right cab opening 204 is positioned along the right side 18 of the delivery vehicle 10. The right cab opening 204 facilitates ingress into and egress from the driver compartment 202. The driver compartment 202 may be configured to contain or otherwise support a number of seats (e.g., one or more seats, etc.), storage units (e.g., a mail tray, etc.), and/or other equipment. As shown in FIGS. 1 and 4, the driver compartment 202 is configured to provide seating for an operator (e.g., a driver, etc.) of the delivery vehicle 10 with a seat, shown as driver seat 210. In some embodiments, the driver compartment 202 is configured to provide seating for a passenger of the delivery vehicle 10 (e.g., a temporary training seat, a repositionable passenger seat, etc.). The driver compartment 202 may also include various controls for driving the delivery vehicle 10 and/or operating the systems thereof (e.g., a user interface, a touchscreen, a display, a steering wheel, an accelerator pedal, a brake pedal, control levers, buttons, switches, etc.).

As shown in FIGS. 1-3 and 6, the cargo body 400 defines a second interior section or zone, shown as cargo compartment 402, a third opening, shown as side cargo opening 404, and a fourth opening, shown as rear cargo opening 406. The side cargo opening 404 is positioned along the right side 18 of the delivery vehicle 10 adjacent the right cab opening 204 with the right B-pillar 114 separating the two. The side cargo opening 404 facilitates ingress into and egress from the cargo compartment 402 from the right side 18 of the delivery vehicle 10. The rear cargo opening 406 is positioned at the rear end 16 of the delivery vehicle 10. The rear cargo opening 406 facilitates ingress into and egress from the cargo compartment 402 from the rear end 16 of the delivery vehicle 10. According to an exemplary embodiment, the cargo compartment 402 is configured to receive and store parcels (e.g., mail, packages, etc.) for transport and delivery via the delivery vehicle 10. In some embodiments, the cargo compartment 402 includes cabinets, shelves, racks, and/or other storage devices to facilitate organizing and securing the parcels within the cargo compartment 402.

As shown in FIGS. 1 and 3, the partition 600 is a partial partition that defines an opening, shown as passageway 602, that connects the driver compartment 202 to the cargo compartment 402. In some embodiments, the partition 600 includes a door or gate that at least partially and selectively encloses the passageway 602. In other embodiments, the partition 600 is a full partition that completely segregates the driver compartment 202 from the cargo compartment 402.

Figure 7:
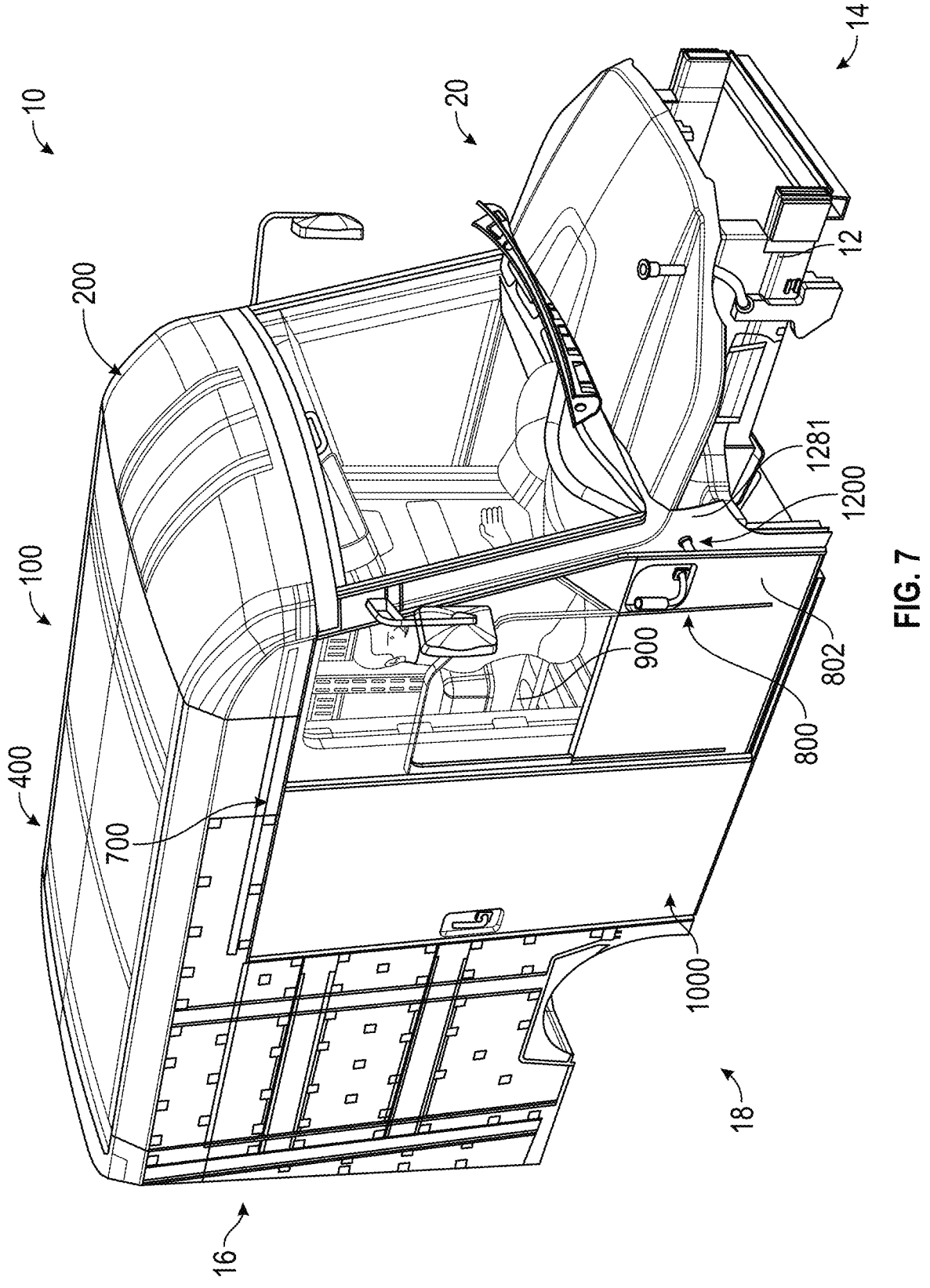
FIG. 7 is a right side perspective view of the delivery vehicle of FIG. 6 having the side door assembly, according to an exemplary embodiment.

As shown in FIG. 7, the side door assembly 700 includes a first door, shown driver cab door 800, a second door, shown as side cargo door 1000, and a locking assembly, shown as door locking assembly 1200. The driver cab door 800 extends over the right cab opening 204 and is selectively openable to access the driver compartment 202. According to an exemplary embodiment, the driver cab door 800 translates or slides rearward along the right side 18 of the body 100 from a closed position to an open position (e.g., such that the driver cab door 800 at least partially overlaps with the side cargo door 1000, extends past the B-pillar 114, etc.). In other embodiments, the driver cab door 800 is hingedly coupled to the body 100 (e.g., the A-pillar 112, etc.) and pivots between a closed position and an open position. As shown in FIG. 7, the driver cab door 800 includes a panel, shown as door panel 802, and a window assembly, shown as window assembly 900, disposed within the door panel 802. According to an exemplary, the delivery vehicle 10 includes a second cab door or passenger cab door positioned on the left side 20 of the cab 200 that extends over the left cab opening 206 and is selectively openable to access the driver compartment 202. The passenger cab door can similarly slide or pivot between an open position and a closed positioned to facilitate ingress into and egress from the cab 200 from the left side 20 of the delivery vehicle 10. According to an exemplary embodiment, the passenger cab door similarly includes a window disposed therein.

As shown in FIG. 7, the side cargo door 1000 extends over the side cargo opening 404 and is selectively openable to access the cargo compartment 402. According to an exemplary embodiment, the side cargo door 1000 translates or slides forward along the right side 18 of the body 100 from a closed position to an open position (e.g., such that the side cargo door 1000 at least partially overlaps with the driver cab door 800, toward the A-pillar 112, etc.). In another embodiment, the side cargo door 1000 translates or slides rearward along the right side 18 of the body 100 from a closed position to an open position (e.g., away from the right cab opening 204, toward the C-pillar 116, etc.). In other embodiments, the side cargo door 1000 is hingedly coupled to the body 100 (e.g., the B-pillar 114, etc.) and pivots between a closed position and an open position. According to an exemplary embodiment, the delivery vehicle 10 includes a rear door assembly that includes a rear cargo door. The rear cargo door extends over the rear cargo opening 406 and is selectively openable to access the cargo compartment 402.

Electric Delivery Vehicle

Overview

Figure 8:
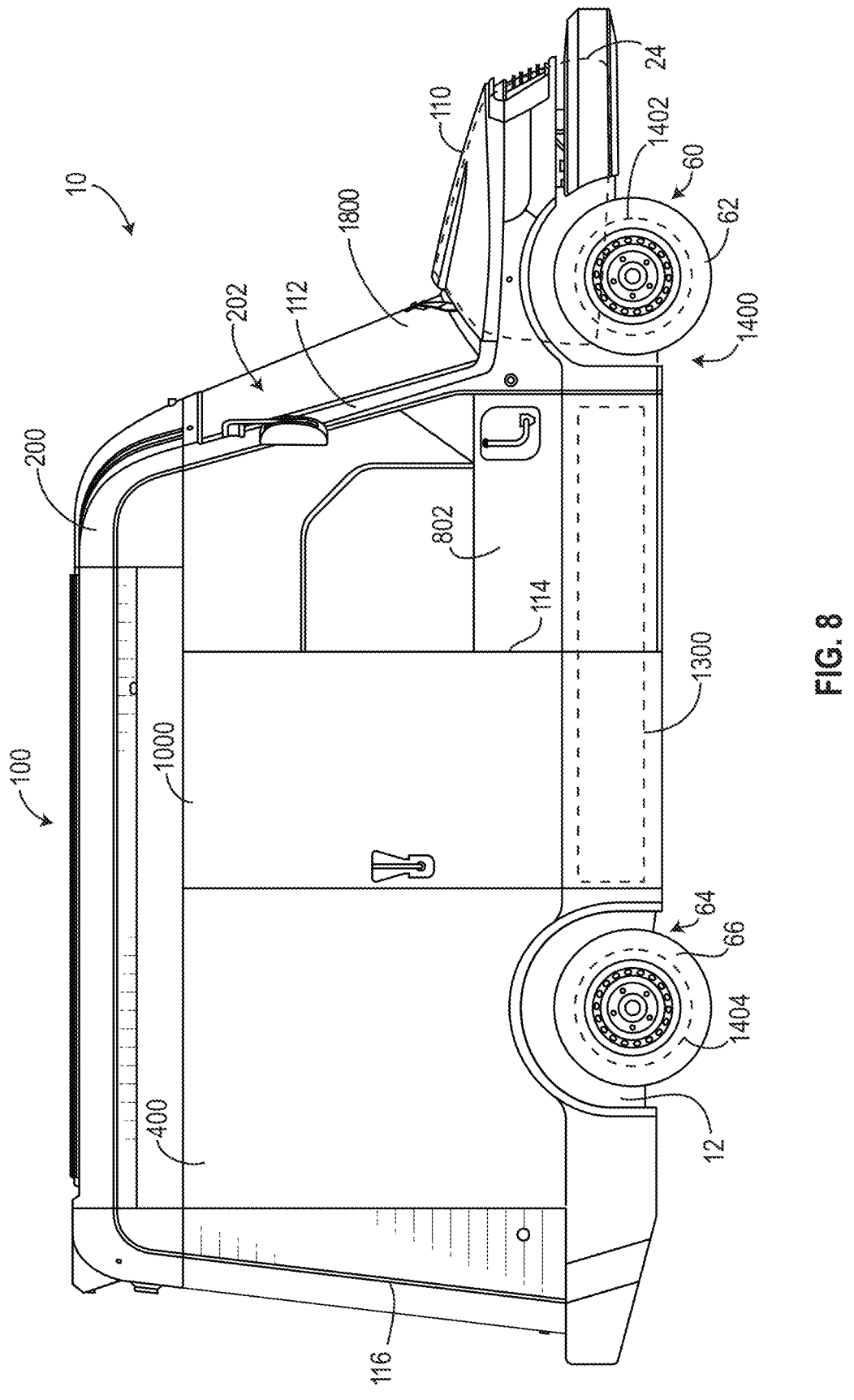
FIG. 8 is a side view of the delivery vehicle of FIG. 1 provided as an electric vehicle, according to an exemplary embodiment.

Referring to FIG. 8, the delivery vehicle 10 may be configured as a fully electric vehicle that uses electrical energy in order to transport (e.g., to drive the front wheels 62 and the rear wheels 66), according to an exemplary embodiment. The delivery vehicle 10 may include an electrical drivetrain 1400 (e.g., an electrically powered chassis, an electrically powered drive system, etc.) that includes a front electrified-axle ("E-axle") 1402 (e.g., a front electrical motor, an electrical transducer that consumes electrical energy and generates mechanical energy) and a rear E-axle 1404. The electrical drivetrain 1400 also includes an electrical energy storage system ("ESS") 1300 that includes multiple battery cells, electrical storage devices, battery packs, batteries, etc. The ESS 1300 may be positioned beneath a floor of the delivery vehicle 10 and coupled with the frame 12 of the delivery vehicle 10. The ESS 1300 is configured to store electrical energy and provide electrical energy to the front E-axle 1402 and the rear E-axle 1404 (e.g., via high-voltage cables or power distribution system including an inverter) such that the front E-axle 1402 and the rear E-axle 1404 drive the front wheels 62 and the rear wheels 66, respectively, to transport the delivery vehicle 10. The front E-axle 1402 and the rear E-axle 1404 may be coupled with the frame 12 and provide support for the delivery vehicle 10. In some embodiments, the front E-axle 1402 is positioned at least partially within the hood compartment 24. Since the delivery vehicle 10 is powered using electric motors (e.g., the front E-axle 1402 and the rear E-axle 1404), the hood compartment 24 is not occupied by the engine 72, and provides space for one or more electrical components of the electrical drivetrain 1400 such as power distribution devices (e.g., inverters, wire routing, a thermal management system, a charging system, etc.), and/or the front E-axle 1402.

Module Mounting Structure

According to an exemplary embodiment shown in FIGS. 9-19, the delivery vehicle 10 includes a mounting frame, shown as module mounting structure 2500. The module mounting structure 2500 may include a framework (e.g., a support structure) upon which various modules, shown as control modules 2502, can be mounted. The module mounting structure 2500 may be a unitary injection-molded structure. The module mounting structure 2500 facilitates selective removal of the control modules 2502 as a subassembly. For example, the module mounting structure 2500 may be a unitary structure that can be installed within the delivery vehicle 10 and removed from the delivery vehicle 10. The module mounting structure 2500 and the control modules 2502 coupled with or mounted on the module mounting structure 2500 may be installed and removed as a single unit. Accordingly, the control modules 2502 may be mounted on the module mounting structure 2500 prior to installation of the module mounting structure 2500. Additionally, the control modules 2502 may be replaced or repaired by removing the module mounting structure 2500 from the delivery vehicle 10. The individual control modules 2502 (e.g., individual components or modules included in the control modules 2502) may be replaced individually or the entire module mounting structure 2500 including the control modules 2502 may be replaced.

Figure 9:
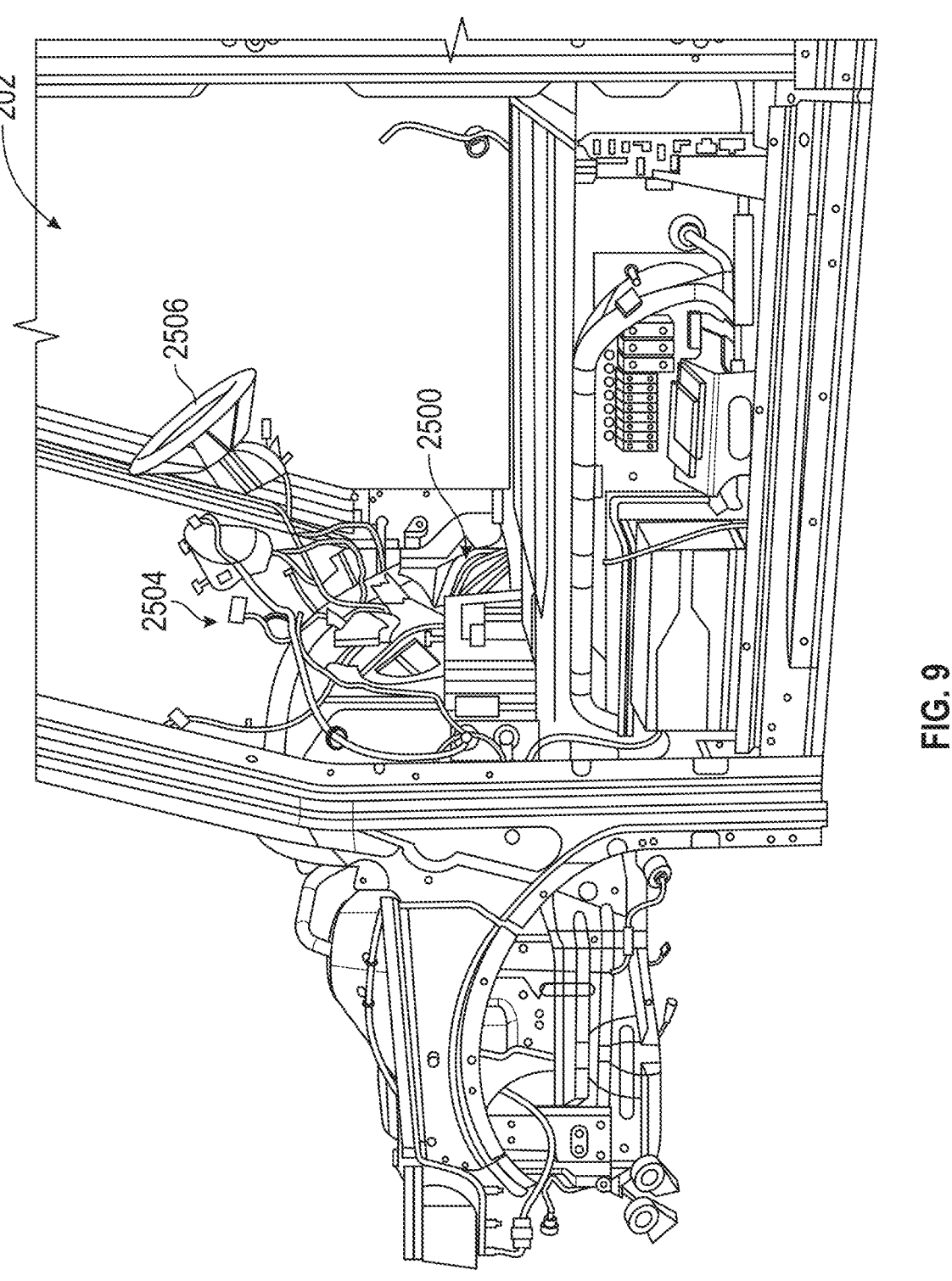
FIG. 9 is a partial side perspective view of the delivery vehicle of FIG. 1 having a module mounting structure, according to an exemplary embodiment.
Figure 10:
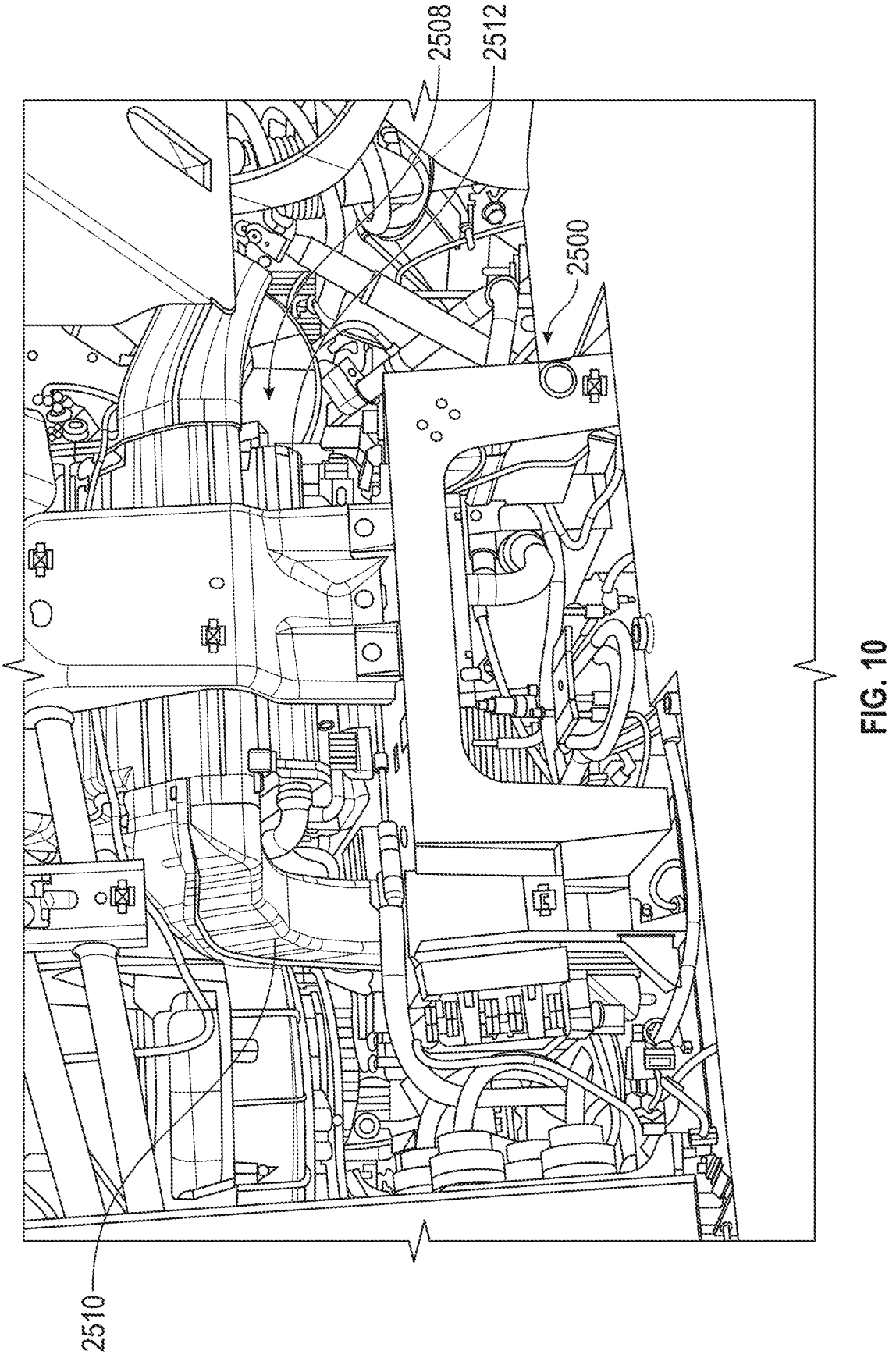
FIG. 10 is a rear view of the module mounting structure of FIG. 9, according to an exemplary embodiment.

Referring to FIGS. 9 and 10, the module mounting structure 2500 may be disposed in the driver compartment 202 of the cab 200 of the delivery vehicle 10. For example, the delivery vehicle 10 may have a dashboard 2504 in the driver compartment 202. The dashboard 2504 may include various components to enhance operation of the delivery vehicle 10. For example, the dashboard 2504 may include a steering wheel 2506, an HVAC system 2508 or portions thereof (e.g., ducts 2510, vents, etc.), displays (e.g., for navigation, vehicle speed, fuel level, warning lights, health monitoring of electronic equipment, etc.), an instrument panel, or other components, and any combination thereof. The module mounting structure 2500 may be disposed, at least partially, under the dashboard 2504. In some embodiments, the module mounting structure 2500 is disposed under a portion of the HVAC system 2508. For example, the module mounting structure 2500 may be disposed below an air conditioning unit, or a portion thereof, shown as condenser 2512. The module mounting structure 2500, and mounted modules (e.g., the control modules 2502), may be selectively removed from the delivery vehicle 10 by disconnecting bolts, opening a panel in the delivery vehicle 10, and pulling the module mounting structure 2500 into the driver compartment 202 of the cab 200. The module mounting structure 2500, and mounted modules (e.g., the control modules 2502), may be selectively installed onto the delivery vehicle 10 by reversing the steps above.

Figure 11:
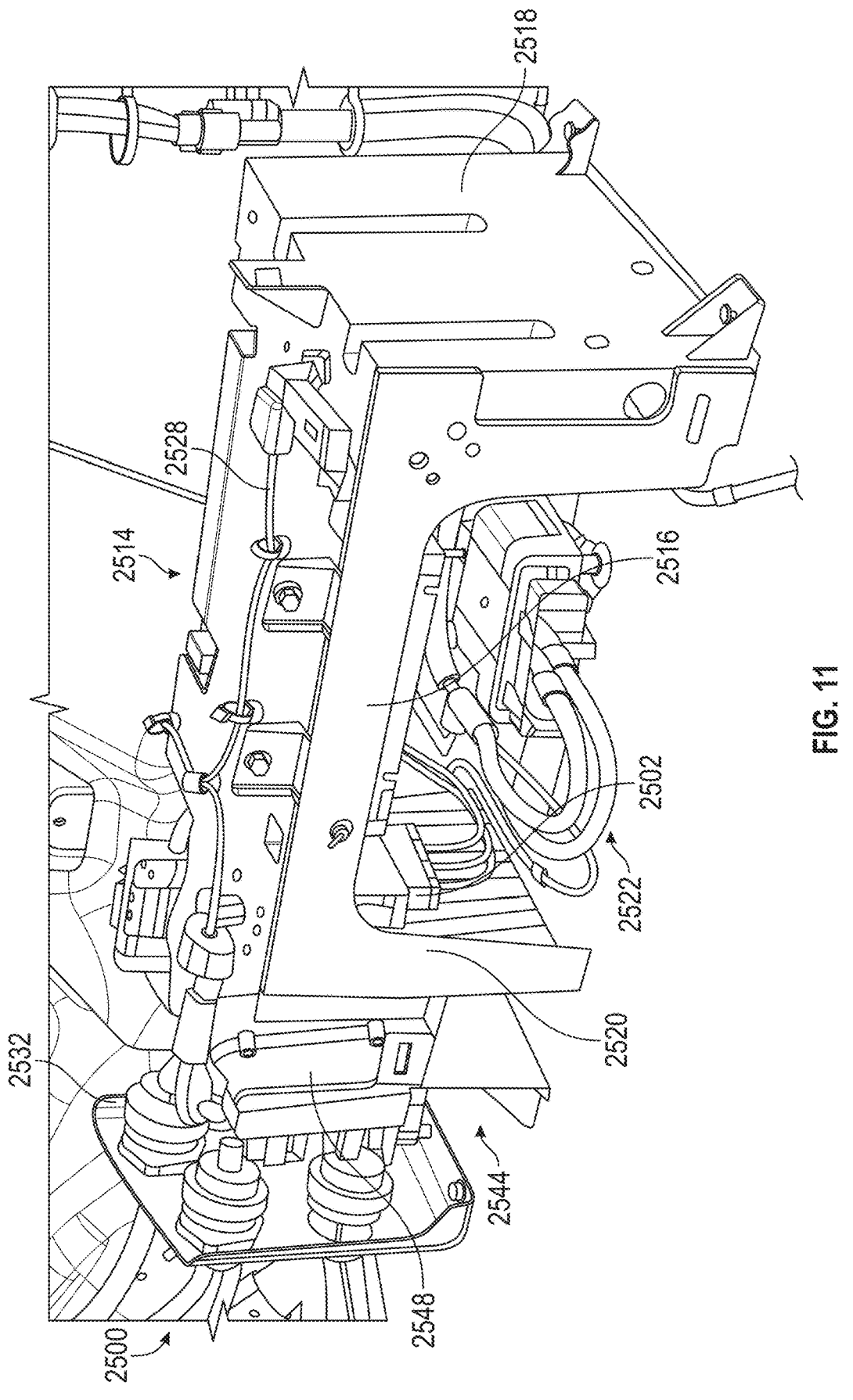
FIG. 11 is a rear perspective view of the module mounting structure of FIG. 9, according to an exemplary embodiment.
Figure 12:
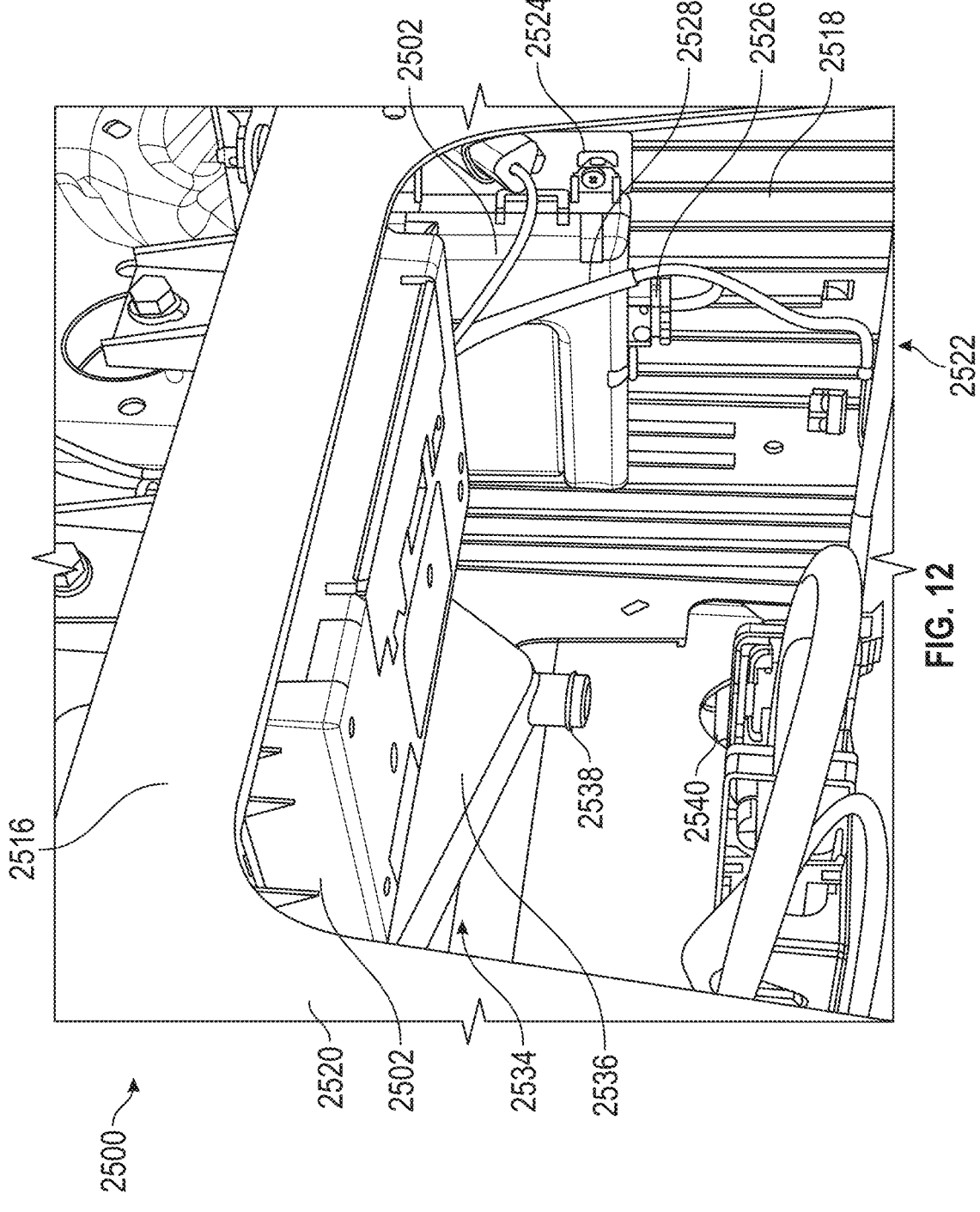
FIG. 12 is a bottom, left perspective view of the module mounting structure of FIG. 9, according to an exemplary embodiment.
Figure 13:
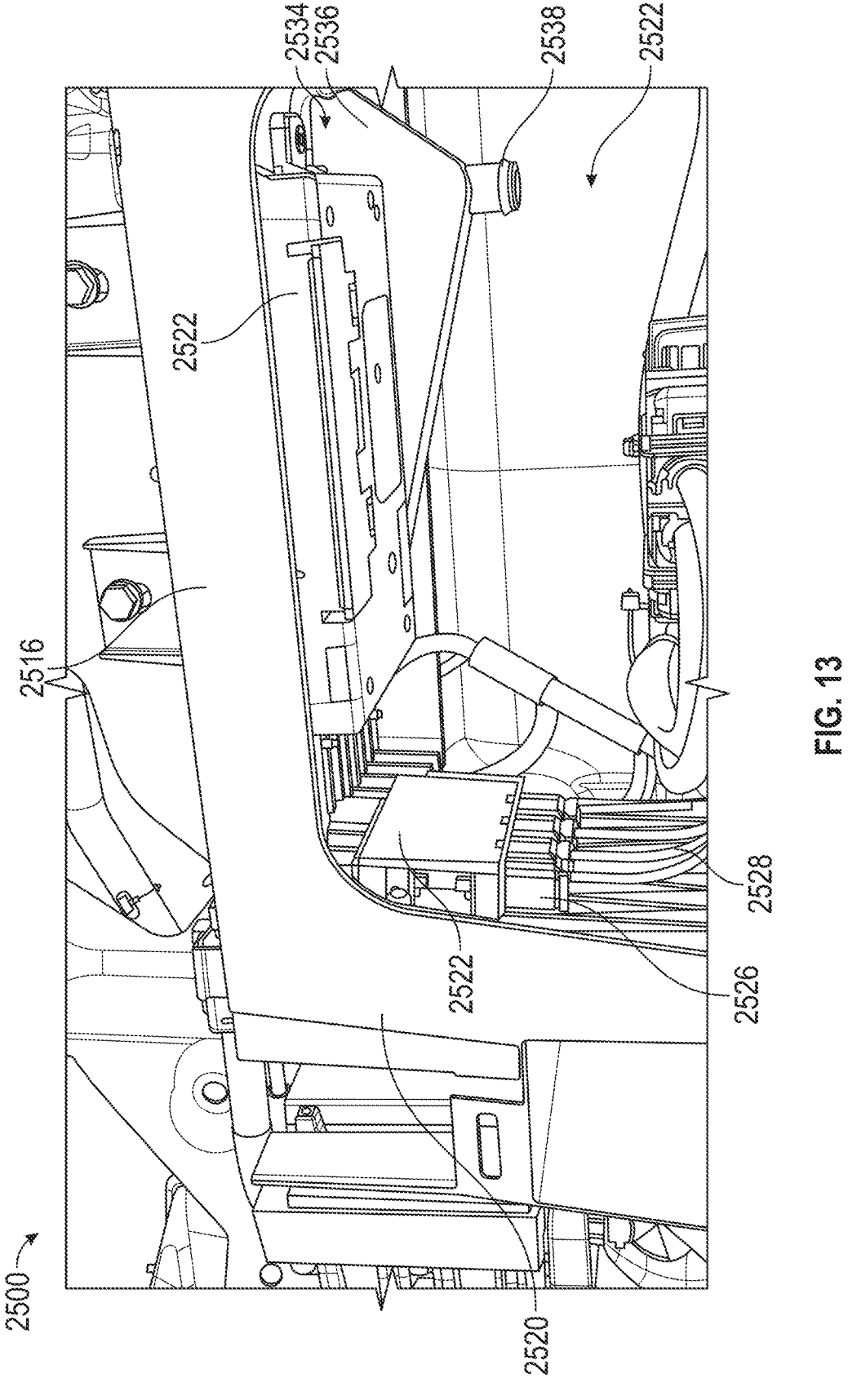
FIG. 13 is a bottom, right perspective view of the module mounting structure of FIG. 9, according to an exemplary embodiment.

Referring to FIGS. 11-13, the module mounting structure 2500 includes a table-like structure. For example, the module mounting structure 2500 includes a main body 2514 (e.g., a support portion, a structural assembly, etc.) having a top portion 2516 (e.g., a top assembly, a support surface, etc.), a first sidewall 2518 (e.g., a side, a wall, a boundary, a vertically extending surface, etc.) extending from a first end of the top portion 2516, and a second sidewall 2520 (e.g., a side, a boundary, a wall, a vertically extending surface, etc.) extending from a second end (e.g., the second end opposite the first end) of the top portion 2516 such that the first sidewall 2518 and the second sidewall 2520 are spaced apart from each other by the top portion 2516. The main body 2514 defines an internal cavity 2522 (e.g., a space, an inner volume, a void, an underbody area, etc.) defined, at least partially, by the top portion 2516, the first sidewall 2518, and the second sidewall 2520. One or more control modules 2502 may be, at least partially, disposed in the internal cavity 2522. For example, a control module 2502 may be coupled with or mounted on an internal surface of the main body 2514. In some embodiments, a control module 2502 may be mounted on at least one of an internal surface of the first sidewall 2518, an internal surface of the top portion 2516, or an internal surface of the second sidewall 2520. In some embodiments, control modules 2502 (e.g., electronic components, circuitry, micro-controllers, communications bus devices, etc.) are disposed in the internal cavity 2522 and mounted on the internal surfaces of the main body 2514. In some embodiments, a control module 2502 may be disposed outside of the internal cavity 2522 of the module mounting structure 2500. For example, a control module 2502 may be coupled with an external surface of the main body 2514. In some embodiments, a control module 2502 may be mounted on at least one of an external surface of the first sidewall 2518, an external surface of the top portion 2516, or an external surface of the second sidewall 2520. In some embodiments, the module mounting structure 2500 supports all control modules 2502. In some embodiments, a portion of the internal cavity 2522 between the first sidewall 2518 and the second sidewall 2520 defines a flow space, an inlet, an outlet, etc., for air to enter or discharge to/from the HVAC system 2508.

The control module 2502 may be any module configured to control a component or function of the delivery vehicle 10. For example, the control module 2502 may be a telematics module (e.g., for controlling data transfer between the delivery vehicle 10 and other devices or vehicles), an engine control module (e.g., for controlling engine timing), a keyless entry module (e.g., for controlling remote lock and unlocking functionality), a four-wheel drive module (e.g. for controlling engagement of wheels), an electrified axle (E-axle) module (e.g., for controlling operation of the front E-axle 1402 and the rear E-axle 1404), or a brake module (e.g., for controlling the brakes), among other modules.

As shown in FIG. 12, the module mounting structure 2500 includes at least one module mount 2524 (e.g., an interlocking feature, a snap feature, a fastener aperture, a fastener, etc.). The module mount 2524 may couple a control module 2502 with the module mounting structure 2500. For example, the control module 2502 may mount to the module mounting structure 2500 via the module mount 2524. The module mount 2524 may be any element configured to retain a control module 2502 in a desired position. For example, the module mount 2524 include a pocket to receive a control module 2502, a shelf or ledge on which a control module 2502 may be placed, or a plate or surface to which the control module 2502 may be fixed (e.g., bolted, screwed, etc.), among others. The module mount 2524 may be disposed on an inner surface such that the module that can be coupled to the module mount 2524 is positioned at least partially within the internal cavity 2522.

As shown in FIGS. 12 and 13, the control module 2502 includes at least one module connector 2526. The module connector 2526 may receive or interface with a portion of an electrical conduit to electrically couple the control module 2502 with other electronic components of the delivery vehicle 10 (e.g., controls for driving the delivery vehicle 10, controls for operating the systems of the delivery vehicle, electrical sub-systems, etc.). By way of example, the other components associated with the delivery vehicle 10 may include a user interface, a touchscreen, a display, a steering wheel (e.g., steering wheel 2506), an accelerator pedal, a brake pedal, control levers, buttons, switches, or the like. In some embodiments, the control module 2502 is coupled with the mounting module structure 2500 (e.g., via the module mount 2524) such that the control module 2502 is oriented such that the module connector 2526 opens downward. For example, with the module mounting structure 2500 installed in the delivery vehicle 10, the module connector 2526 may open toward a floor of the driver compartment 202. The downward orientation may prevent fluid from accumulating in the module connector 2526.

Referring still to FIGS. 12 and 13, the module mounting structure 2500 includes at least one electrical conduit 2528 (e.g., a cable, a wire, a cord, an assembly of cords, a pigtail, a bundle of cables, etc.). The electrical conduit 2528 may be coupled with or installed within the module mounting structure 2500. The electrical conduit 2528 may electrically couple the control module 2502 with the module mounting structure 2500. In some embodiments, the module mounting structure 2500 includes a plurality of electrical conduits 2528. At least one electrical conduit 2528 may couple each control module 2502 with the module mounting structure 2500. In some embodiments, a plurality of electrical conduits 2528 couple with a single control module 2502.

Figure 14:
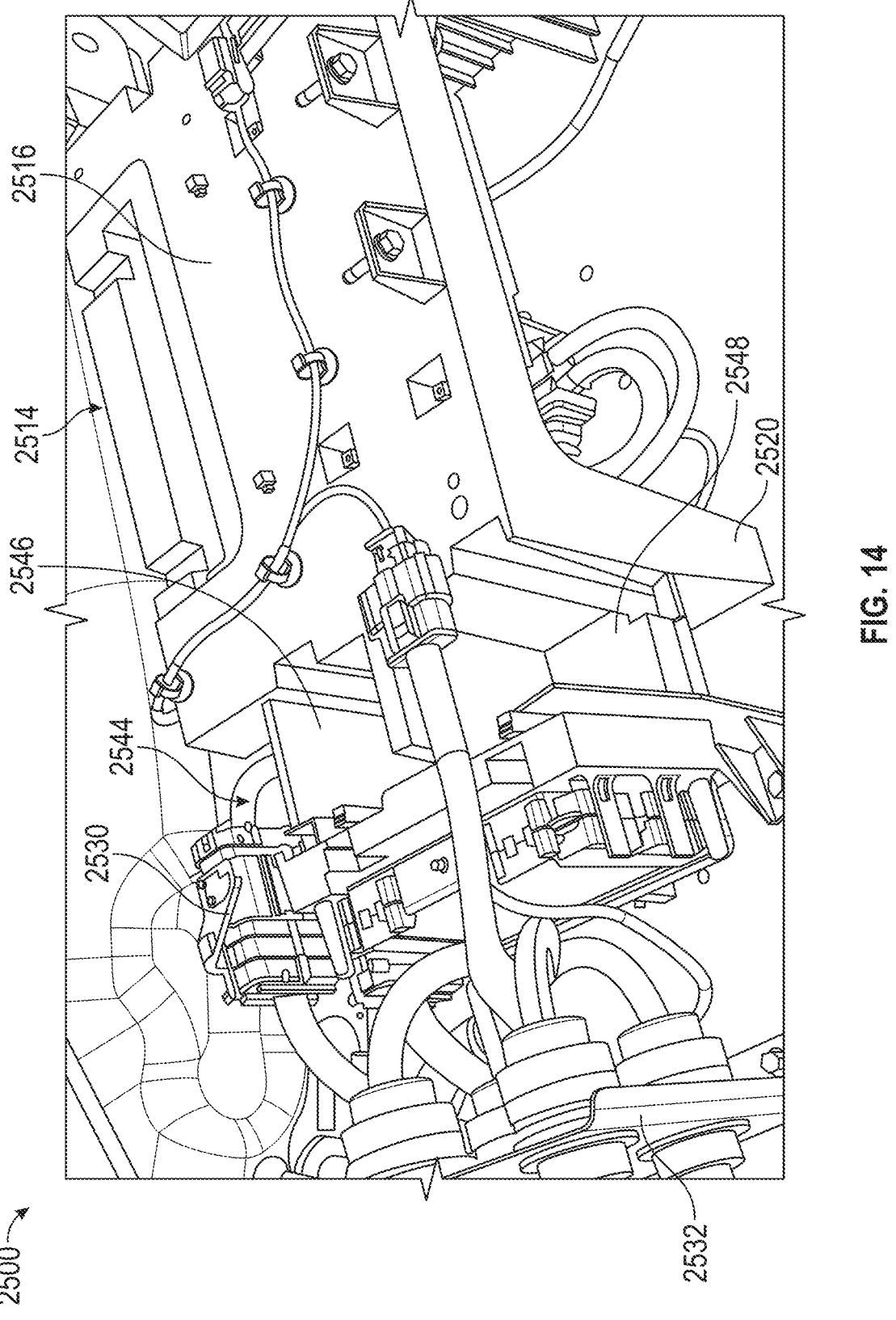
FIG. 14 is a top, left perspective view of the module mounting structure of FIG. 9, according to an exemplary embodiment.
Figure 15:
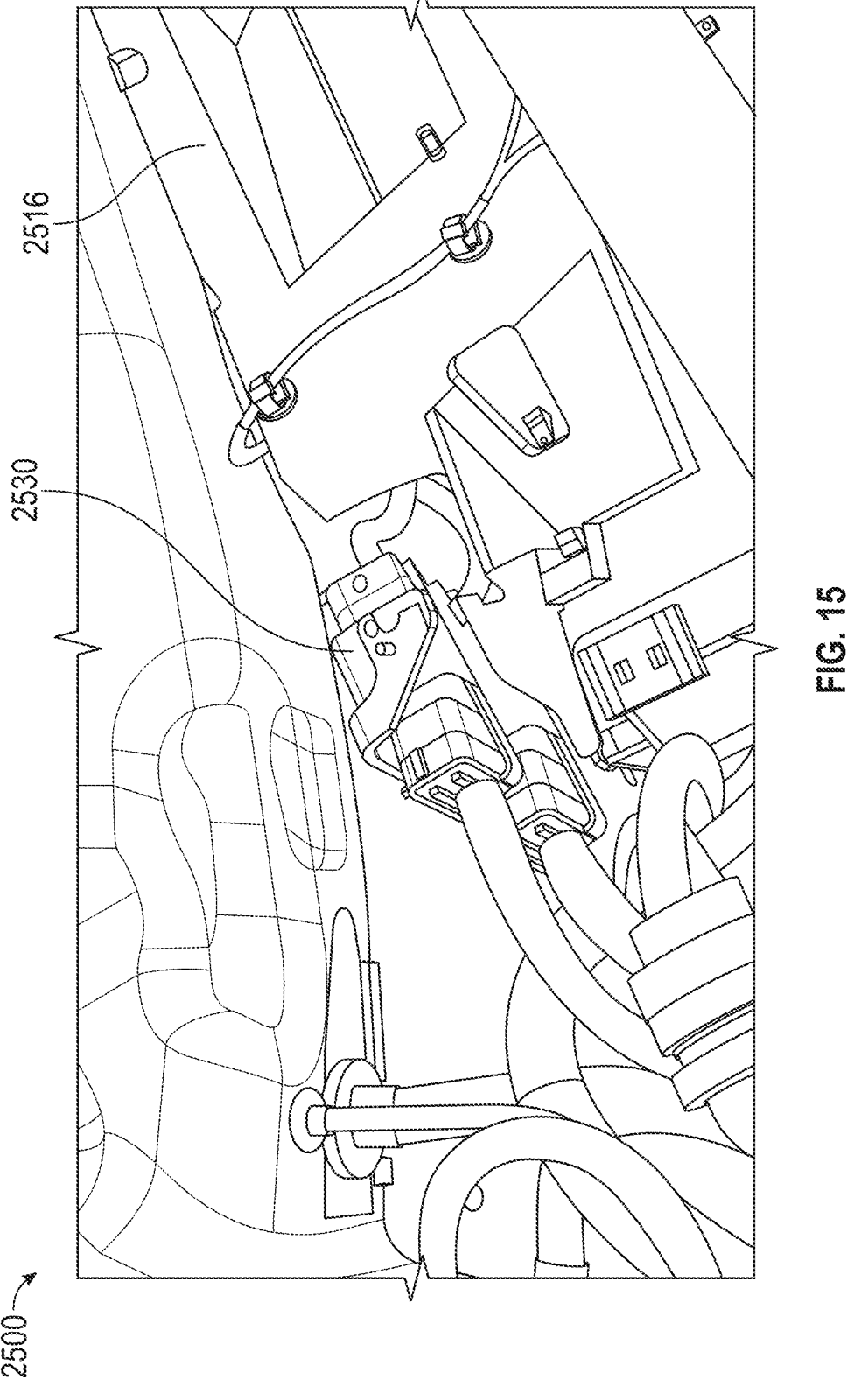
FIG. 15 is a partial top, left view of the module mounting structure of FIG. 9, according to an exemplary embodiment.
Figure 16:
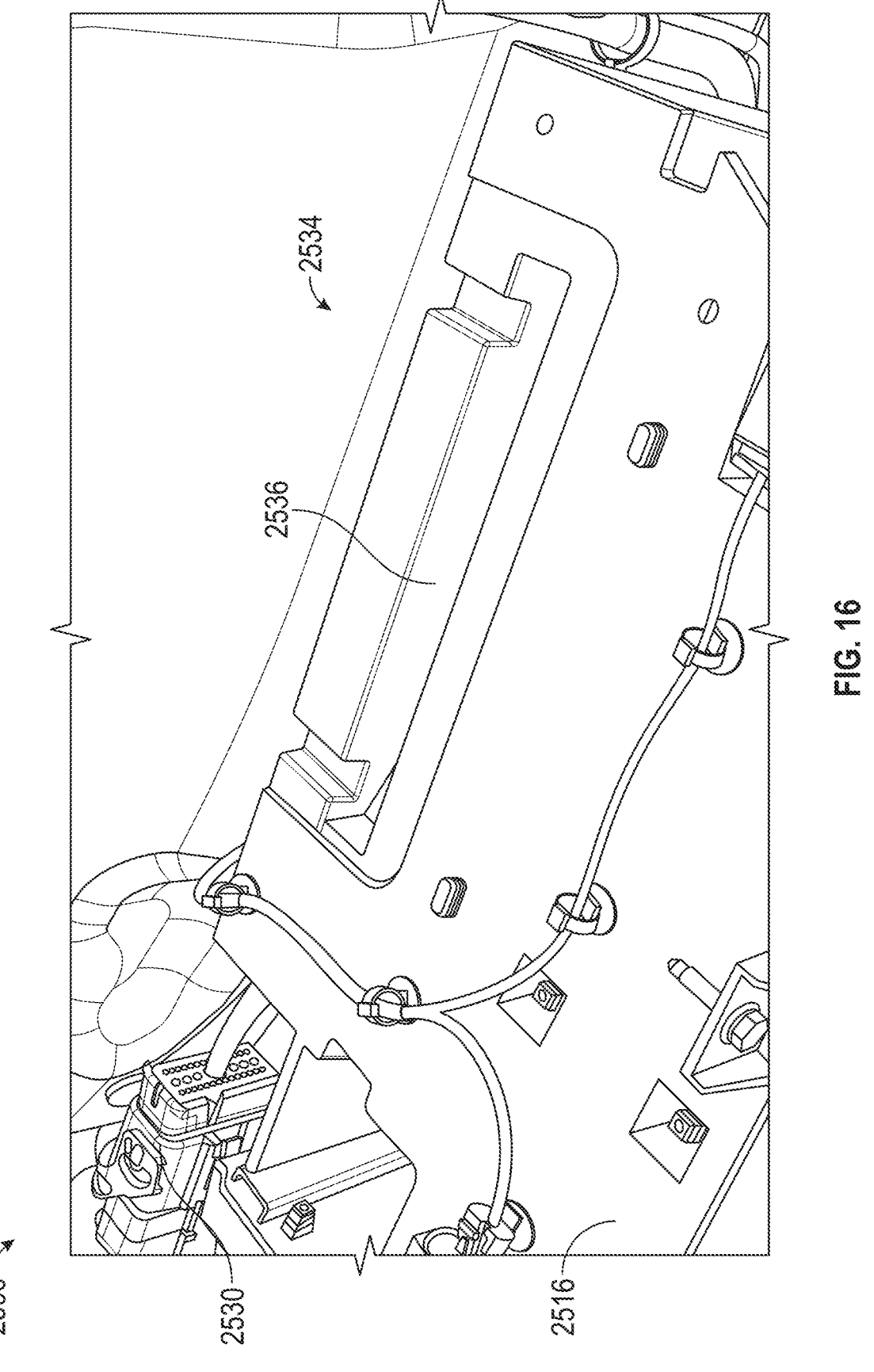
FIG. 16 is a partial top, right perspective view of the module mounting structure of FIG. 9, according to an exemplary embodiment.
Figure 17:
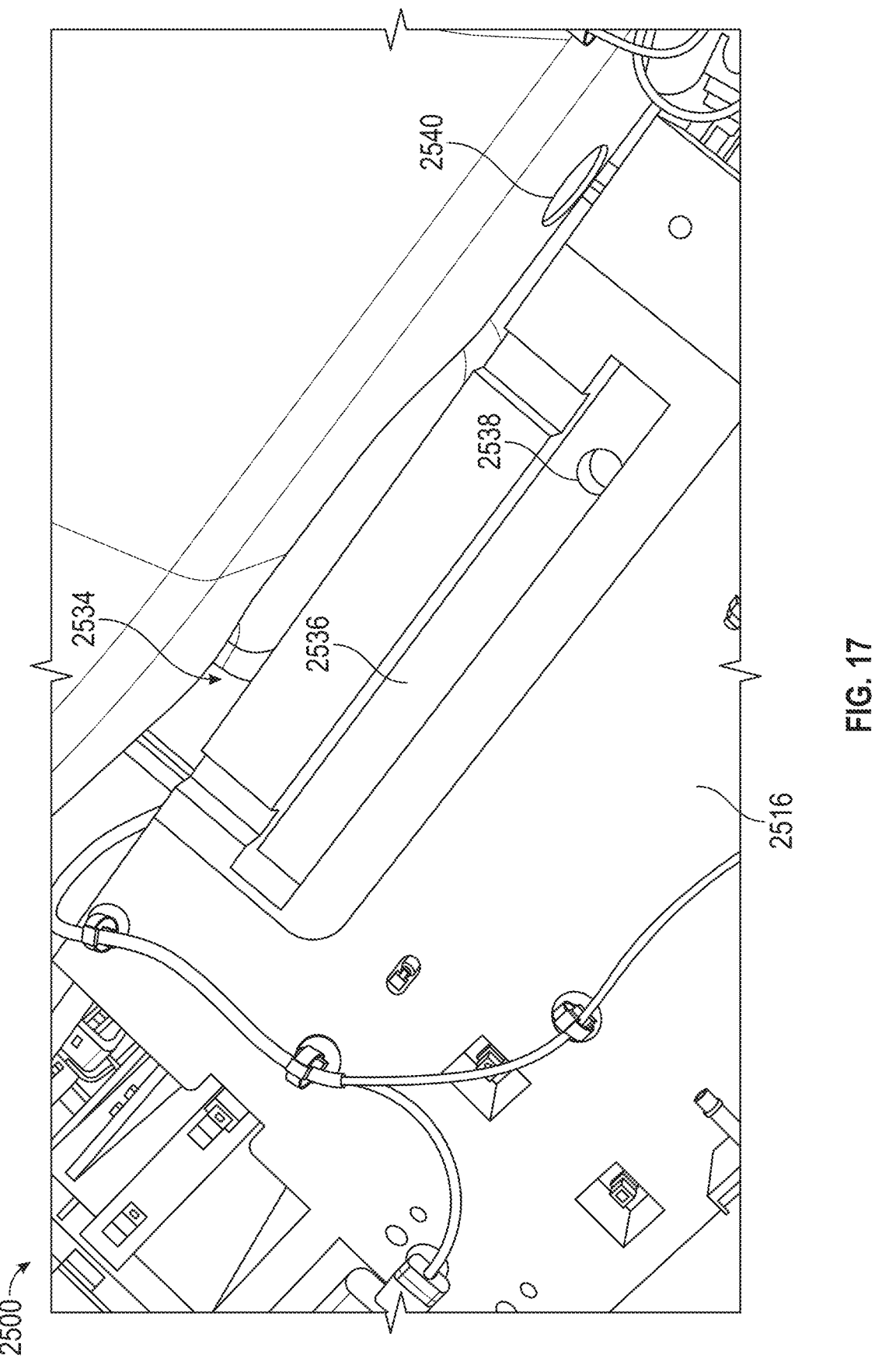
FIG. 17 is a partial top, right view of the module mounting structure of FIG. 9, according to an exemplary embodiment.
Figure 18:
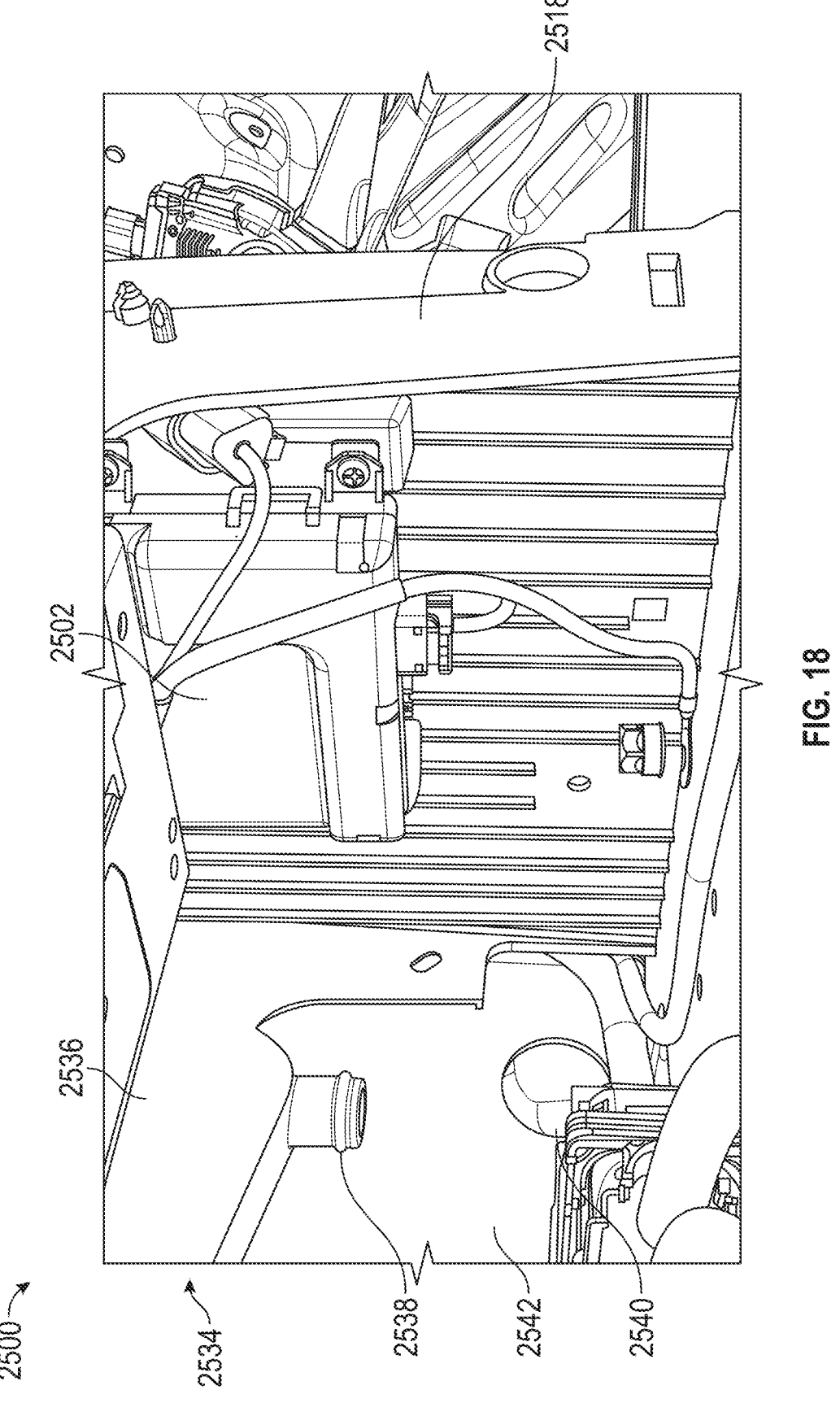
FIG. 18 is a partial left perspective view of an internal cavity of the module mounting structure of FIG. 9, according to an exemplary embodiment.

Referring to FIGS. 14-16, the module mounting structure 2500 includes at least one structure connector 2530 (e.g., a structural coupler, a structural mounting portion, an interlocking portion, a receiving or module support member, etc.). The structure connector 2530 may electrically couple a control module 2502 with the rest of the delivery vehicle 10. For example, the structure connector 2530 may be coupled with the module mounting structure 2500. In some embodiments, the structure connector 2530 is disposed on a front side of the module mounting structure 2500 (e.g., the side of the module mounting structure 2500 facing toward the front of the delivery vehicle 10 when installed therewith). The structure connector 2530 may connect with a conduit hub 2532 (e.g., a cable coupling plate) of the delivery vehicle 10. The conduit hub 2532 may electrically couple the control modules 2502 mounted on the module mounting structure 2500 with the rest of the delivery vehicle 10. For example, the electrical conduits 2528 of the module mounting structure 2500 that electrically couple with the control modules 2502 may be electrically coupled via the structure connector 2530. In some embodiments, all of the electrical conduits 2528 (and therefore all of the control modules 2502) of the module mounting structure 2500 couple with a single structure connector 2530.

Referring to FIGS. 12, 13, and 16-18, the module mounting structure 2500 includes a fluid draining feature 2534. The fluid draining feature 2534 may collect fluid from, for example, the HVAC system 2508 of the delivery vehicle 10, and drain the fluid out of the driver compartment 202 of the delivery vehicle 10. The fluid draining feature 2534 includes a receptacle 2536 (e.g., a recess, a pocket, a receiving portion, etc.). The receptacle 2536 may be disposed in, defined by, or be a part of the top portion 2516 of the module mounting structure 2500. The receptacle 2536 may catch and collect fluid. Sources of fluid may include condensation from the HVAC system 2508, specifically the condenser 2512. For example, the receptacle 2536 may be disposed, at least partially, below the condenser 2512 and configured to catch and collect the waste fluid from the condenser 2512.

As shown in FIGS. 12, 13, 17, and 18, the fluid draining feature 2534 includes a drain 2538 (e.g., an aperture, an opening, a through-hole, a passageway, etc.). The drain 2538 may drain and direct fluid from the HVAC system 2508 out of the driver compartment 202 of the delivery vehicle 10. The drain 2538 may be disposed at a bottom of the receptacle 2536 and may extend within the internal cavity 2522 of the module mounting structure 2500. The receptacle 2536 may have a tapered or funnel shape to funnel or guide the fluid to the drain 2538 for egress via the drain 2538. The drain 2538 may be fluidly coupled with an opening, shown as outlet 2540. The outlet 2540 may be an opening in a firewall 2542 of the delivery vehicle 10. The firewall 2542 may be a barrier in the delivery vehicle 10 between the driver compartment 202 and the hood compartment 24 configured to reduce a likelihood of transfer of heat between the driver compartment 202 and the hood compartment 24. In some embodiments, a conduit (e.g. one or more flexible or rigid tubes) fluidly couples the drain 2538 with the outlet 2540 such that the fluid (e.g., condensation) flows through the module mounting structure 2500 and out through the firewall 2542.

Figure 19:
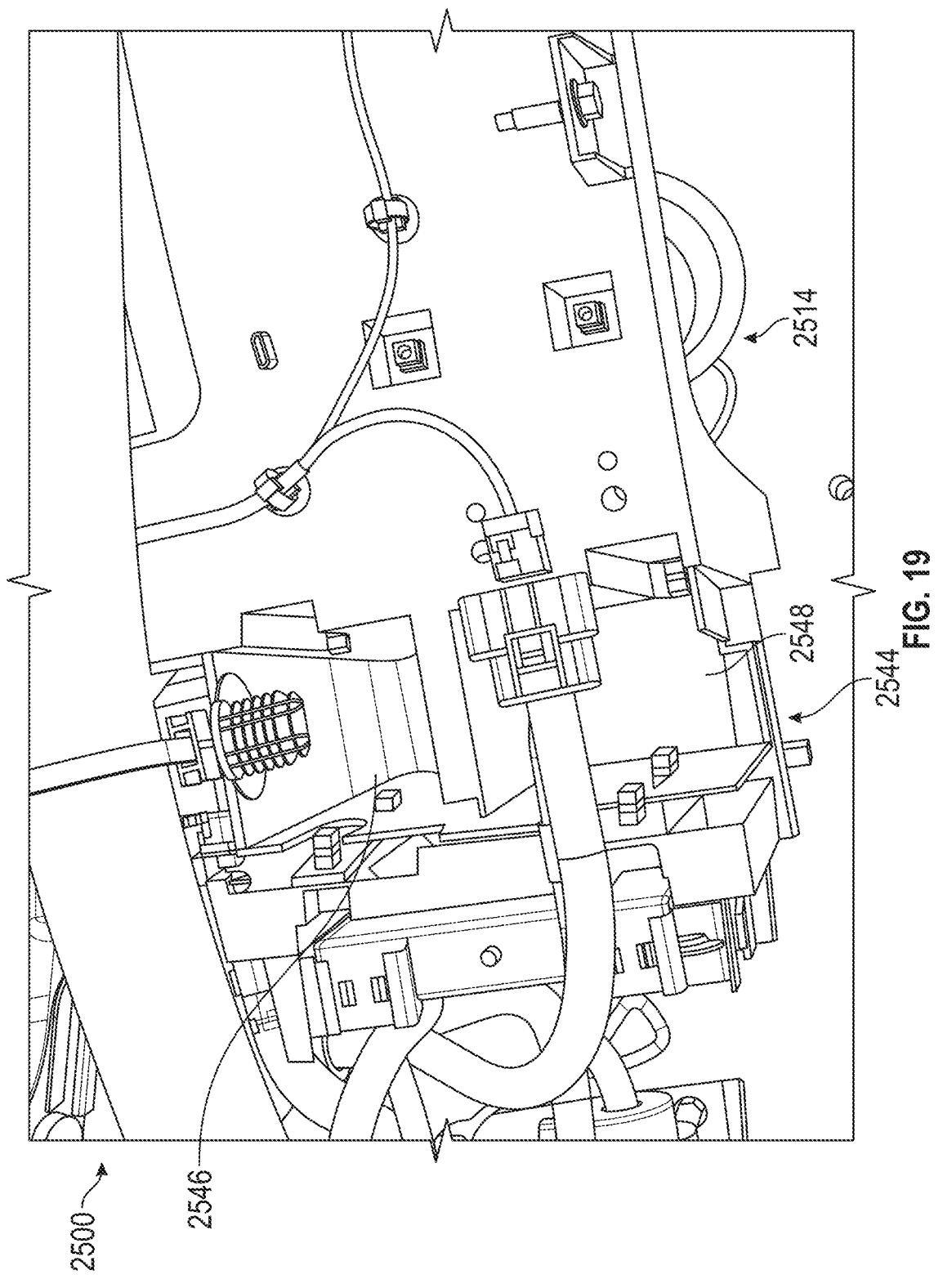
FIG. 19 is a partial top perspective view of the module mounting structure of FIG. 9, according to an exemplary embodiment.

Referring to FIGS. 11, 14, and 19, the module mounting structure 2500 includes a side body 2544. The side body 2544 may be disposed on a side of the main body 2514 (e.g., outside of or external to the internal cavity 2522. For example, the side body 2544 may extend from the second sidewall 2520. The side body 2544 may be integral with the main body 2514. The side body 2544 defines a recess 2546. The recess 2546 may receive at least a portion of (e.g., incorporate) an air duct 2510 of the HVAC system 2508 to facilitate air movement through the cab 200 of the delivery vehicle 10. For example, the recess 2546 may receive or couple with the air duct 2510. The HVAC system 2508 may push or draw air through the recess 2546. For example, the recess 2546 may be part of or couple with a supply air duct 2510 or a return air duct 2510.

In some embodiments, the side body 2544 defines a secondary recess 2548. In some embodiments, the secondary recess 2548 receives at least a portion of a second air duct 2510. In some embodiments, the secondary recess 2548 receives or couples with a different component of the delivery vehicle 10. For example, the secondary recess 2548 may be a module mount 2524 and be configured to house or receive a control module 2502.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. An electric delivery vehicle comprising:
   a cab; and
   a module mounting structure for a control module defining at least a portion of a heating, ventilation, and air-conditioning (HVAC) system, the module mounting structure including:
   a module mount configured to couple the control module with the module mounting structure;
   a drain configured to drain fluid from the HVAC system; and
   a recess configured to receive at least a portion of an air duct of the HVAC system to facilitate air movement through the cab of the electric delivery vehicle,
   wherein the module mounting structure includes an internal cavity defined by at least a top portion, a first sidewall, and a second sidewall,
   wherein the module mount is configured such that the control module is coupled to the module mounting structure within the internal cavity, and
   wherein the drain extends from the top portion of the module mounting structure to a location within the internal cavity such that fluid can be guided from the top portion to said location within the internal cavity.

2. The electric delivery vehicle of claim 1, the first sidewall extends from the top portion at a first end thereof, and the second sidewall extends from the top portion at a second end thereof, the second end opposite the first end.

3. The electric delivery vehicle of claim 1, wherein the fluid includes condensation from the HVAC system.

4. The electric delivery vehicle of claim 1, wherein the module mounting structure further includes a receptacle along a top portion of the module mounting structure configured to collect condensation from the HVAC system and funnel the condensation to the drain.

5. The electric delivery vehicle of claim 1, further comprising a firewall including an outlet, wherein the drain is fluidly coupled with the outlet of the firewall such that condensation from the HVAC system flows through the module mounting structure and out through the firewall.

6. The electric delivery vehicle of claim 1, wherein the recess is positioned along a sidewall of the module mounting structure outside of an inner volume of the module mounting structure.

7. The electric delivery vehicle of claim 1, wherein the module mount is configured to couple the control module with at least one of the top portion, the first sidewall, or the second side wall of the module mounting structure.

8. The electric delivery vehicle of claim 1, wherein the module mounting structure further includes a connector configured to electrically couple the control module with other components of the electric delivery vehicle.

9. The electric delivery vehicle of claim 1, wherein the control module includes a module connector, and wherein the control module is configured to be coupled to the module mounting structure such that the control module is oriented such that the module connector opens downward to prevent fluid accumulation in the module connector.

10. The electric delivery vehicle of claim 1, wherein the module mounting structure is a unitary injection-molded structure that is selectively removable from the electric delivery vehicle.

11. A module mounting structure for an electric delivery vehicle, the module mounting structure comprising:
   a module mount configured to couple a control module with the module mounting structure, the control module defining at least a portion of a heating, ventilation, and air-conditioning (HVAC) system;
   a drain configured to drain fluid from the HVAC system; and
   a recess configured to receive at least a portion of an air duct of the HVAC system to facilitate air movement through a cab of the electric delivery vehicle,
   wherein the module mounting structure is selectively removable from the electric delivery vehicle,
   wherein the module mounting structure includes an internal cavity defined by at least a top portion, a first sidewall, and a second sidewall,
   wherein the module mount is configured such that the control module is coupled to the module mounting structure within the internal cavity, and
   wherein the drain extends from the top portion of the module mounting structure to a location within the internal cavity such that fluid can be guided from the top portion to said location within the internal cavity.

12. The module mounting structure of claim 11, wherein the first sidewall extends from the top portion at a first end thereof, and the second sidewall extends from the top portion at a second end thereof, the second end opposite the first end.

13. The module mounting structure of claim 12, wherein the fluid includes condensation from the HVAC system, and wherein the module mounting structure further comprises a receptacle along the top portion of the module mounting structure and configured collect the condensation and funnel the condensation to the drain.

14. The module mounting structure of claim 11, wherein the drain is fluidly coupled with an outlet of a firewall of the electric delivery vehicle such that condensation from the HVAC system flows through the module mounting structure and out through the firewall.

15. The module mounting structure of claim 11, further comprising a connector configured to electrically couple the control module with other components of the electric delivery vehicle.

16. The module mounting structure of claim 15, wherein the control module includes a module connector, and wherein the control module is configured to be coupled to the module mounting structure such that the control module is oriented such that the module connector opens downward to prevent fluid accumulation in the module connector.

17. An electric delivery vehicle comprising:

a cab; and

14 a module mounting structure for a control module defining at least a portion of a heating, ventilation, and air-conditioning (HVAC) system, the module mounting structure including:

a module mount configured to couple the control module with the module mounting structure;

a drain defined by the module mounting structure and configured to direct fluid from the HVAC system;

a recess configured to receive at least a portion of the HVAC system; and a connector configured to electrically couple the control module with other components of the electric delivery vehicle, wherein the module mounting structure is selectively removable from the electric delivery vehicle, wherein the recess is positioned along a sidewall of the module mounting structure outside of the internal cavity, wherein the module mounting structure includes an internal cavity defined by at least a top portion, a first sidewall, and a second sidewall, wherein the module mount is configured such that the control module is coupled to the module mounting structure within the internal cavity, and wherein the drain extends from the top portion of the module mounting structure to a location within the internal cavity such that fluid can be guided from the top portion to said location within the internal cavity.

* * * * *